May 21, 1935.     R. G. AREY ET AL     2,002,445
TRANSVERSELY MAGNETIZED VANE INSTRUMENT
Filed Jan. 26, 1934
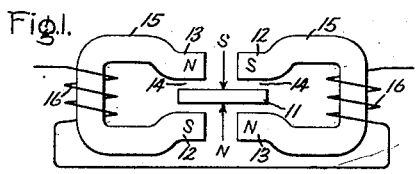
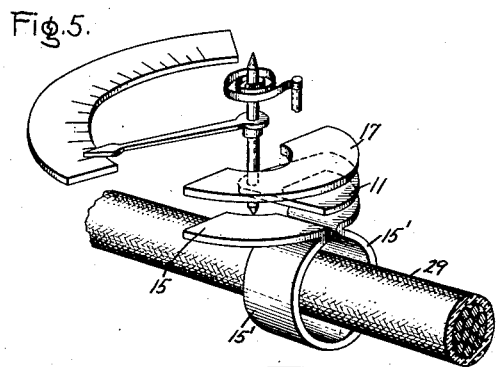
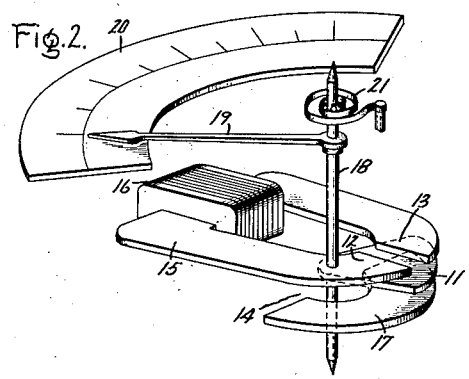
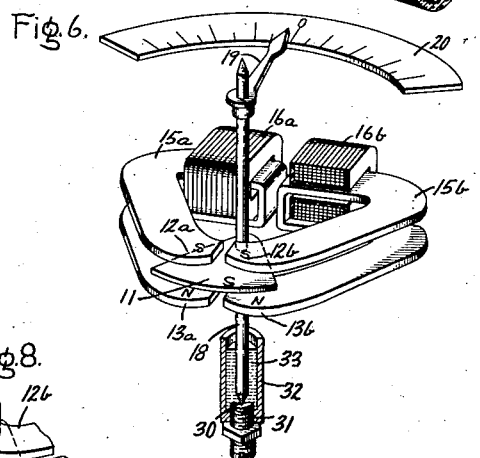
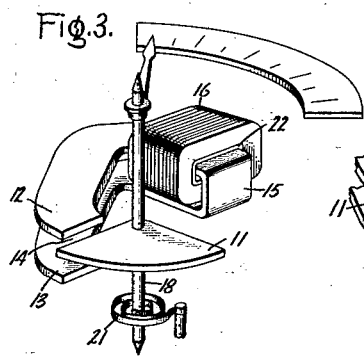
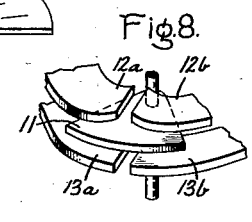
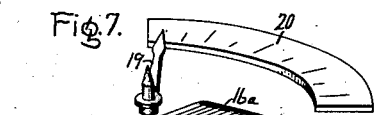
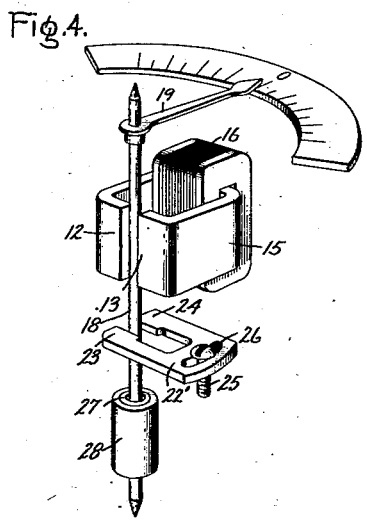
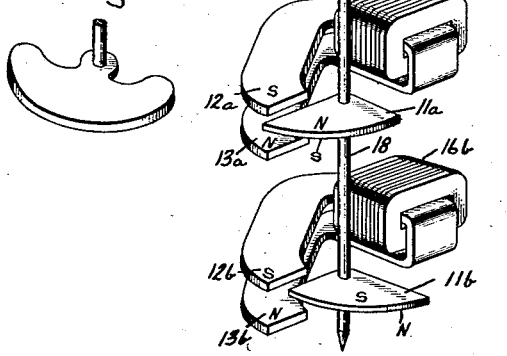
Inventors,
Ralph G. Arey,
Harold T. Faus,
by Harry E. Dunham
Their Attorney.

Patented May 21, 1935

2,002,445

UNITED STATES PATENT OFFICE 2,002,445

TRANSVERSELY MAGNETIZED VANE INSTRUMENT

Ralph G. Arey, Swampscott, and Harold T. Faus, Lynn, Mass., assignors to General Electric Company, a corporation of New York Application January 26, 1934, Serial No. 708,440

9 Claims. (Cl. 171—95)

Our invention relates to deflecting instruments and concerns particularly current responsive devices of the moving vane type.

It is an object of our invention to provide a simple, sturdy, relatively light, highly sensitive instrument which may be easily constructed at low cost.

Another of the objects of our invention is to produce an instrument in which a high torque-to-weight ratio may be obtained with reduced excitation in ampere turns.

Other objects are the obtaining of a greater scale length and more nearly uniform scale law.

Still another object is to produce an instrument for indicating the true average value of current.

Other and further objects and advantages will become apparent as the description proceeds.

In carrying out our invention in its preferred form, we utilize a movable element consisting of a rotatable vane or a rotatable rod which is permanently magnetized transversely, that is, in the direction of its minimum dimension instead of longitudinally. The permanently magnetized elements are preferably composed of a material having a high coercive force in order to obtain the requisite sensitivity and permanency of the calibration. The movable permanently magnetized element cooperates with a stationary element having a pair of pole pieces spaced to form an air gap in which the movable element is permitted to rotate. In the case of electrical instruments, the stationary pole pieces are formed at the ends of a magnetic yoke, preferably composed of a highly permeable magnetic material and which carries a current conducting winding.

The features of our invention which we believe to be novel and patentable will be pointed out in the claims appended hereto. A better understanding of our invention, however, may be obtained by referring to the following description taken in connection with the accompanying drawing in which Fig. 1 is a schematic diagram illustrating the principle of our invention, Fig. 2 is a perspective view of the working elements of an instrument constructed in accordance with one embodiment of our invention; Fig. 3 is a perspective view of another embodiment of our invention; Fig. 4 is a view in perspective of an embodiment of our invention in which the spindle, itself serves as the rotatable permanently magnetized element; Fig. 5 represents in perspective still another modification of our invention; Figs. 6 and 7 represent in perspective two embodiments of our invention carried out as ratio instruments; and Figs. 8 and 9 illustrate modifications in portions of the instrument of Fig. 6.

Referring now more in detail to the drawing in which like reference characters are used to designate like parts throughout, in the forms of the invention illustrated in Figs. 1 to 3 and 5 to 7, the movable element carries an eccentrically mounted magnetic vane 11 which differs, however, from the magnetic vanes heretofore employed in connection with magnetic and electrical instruments in that it is magnetized transversely or in the direction of its thickness. For example, in Fig. 1, the upper face of the vane 11, designated by the letter S, is a south pole and the lower face, designated by the letter N, is a north pole. The direction of magnetization, or the direction of the magnetic field produced by the permanently magnetized vane 11, is perpendicular to the faces S and N of the vane 11.

Owing to the large demagnetizing force which exists in a short permanent magnet, it is important to utilize a material for the vane 11 which has a relatively high coercive force. Our invention is, of course, not restricted to the use of any particular material for this purpose but we have found that an alloy composed of silver, aluminum, and manganese, is satisfactory for this purpose. Such an alloy has been produced having a coercive force of approximately six thousand oersteds, which produces very satisfactory instruments having less weight than the customary magnetic vane instruments. A suitable composition for the magnetic vane we have found to be approximately 87% of silver, approximately 4.3% aluminum, and 8.7% of manganese. However, a wide variation in percentages is permissible.

The stationary element consists of one or more pairs of pole pieces 12 and 13 forming air gaps 14 within which the vane 11 is permitted to deflect. In Fig. 1, the two pairs of pole pieces 12 and 13 are formed by the ends of the magnetic yokes 15 and carry current conducting windings 16 connected in series. An equivalent arrangement is produced in Fig. 2 by means of the single magnetic yoke 15 and the auxiliary magnetic member 17 spaced from the ends 12 and 13 of the magnetic yoke to form the air gap 14. In this case, a single current conducting winding 16 is employed. The magnetic members 15 and 17 are preferably composed of a material having a high permeability, such as a nickel-iron alloy. Alloys composed, for example, of either approximately 47% nickel, or approximately 78½% nickel and iron have been found satisfactory for this purpose.

In the form of the instrument illustrated in Fig. 2, the movable vane 11 is mounted on a rotatable shaft 18 supported by bearings, not shown, and carrying a movable pointer 19 cooperating with a scale 20. In this form of the invention, a biasing spring 21 serves to fix the zero or the neutral position of the movable element.

In the arrangement illustrated in Fig. 3, a single magnetic yoke 15 is employed having the end or pole portions 12 and 13 between which a single air gap 14 is produced.

The operation of these embodiments of our invention will be readily understood from a consideration of Fig. 1. The connections of the windings 16 are such that when direct current flows through the windings 16, the poles 12 of the magnetic yokes 15 become south poles and the poles 13 become north poles. If one of the magnetic yokes 15 is omitted, the action is obviously the same except that either repulsion or attraction alone is relied upon to produce the instrument torque. It is apparent that the south pole at the top faces of the vane 11 will be repelled by the upper south pole 12 and will be attracted by the upper north pole 13, whereas the lower pole face N will be attracted by the lower south pole 12 and repelled by the lower north pole 13, thereby tending to deflect the vane 11 to the left.

Owing to the fact that the angular relationship between the magnetic fields of the stationary and movable elements remains substantially unchanged as the movable element deflects, a substantially uniform scale distribution is obtained and a scale of relatively great length may be employed. Since the magnetic vane is permanently magnetized, the position of the pointer in case of fluctuating values gives a true indication of the average value of the current flowing in the windings, instead of depending upon the average value of current squared, as would be the case with a soft iron vane magnetized by induction from the measured current. The fact that sheet material may be used for the magnetic path in both the stationary and the movable elements obviously results in an exceptionally light instrument, having a high torque-to-weight ratio for a reduced value of ampere turn excitation.

The arrangements shown in Figs. 1 and 2 in which both attraction and repulsion exist have the advantage that, in this form, the torque for a given air gap density is increased and the instruments are astatic, that is, there is relatively little tendency for the instruments to be affected by external fields produced by the earth's magnetism or other electrical machinery in the proximity of the instrument, owing to the fact that a given variation in the magnetization of one magnetic yoke by a stray field tends to be offset by an opposite variation in the other yoke.

In the arrangement illustrated Fig. 3, we have also shown one form of damping arrangement which may, if desired, be employed in connection with instruments constructed in accordance with our invention. As the vane 11 oscillates in the air gap 14, obviously a variation in the flux in the yoke 15 takes place. If a short-circuited turn of, preferably, low resistance conducting material is mounted on any portion of the yoke, eddy currents will be induced in the short-circuited turn, thereby tending to produce magnetic flux opposing an oscillation of the vane 11. A convenient construction is to utilize a short circuited sheet of copper 22 as the shell on which to wind the coil 16 which is, of course, composed of insulated wire.

In the arrangement illustrated in Fig. 4, the shaft or spindle 18 of the movable element serves as the permanently magnetized element. If the spindle 18 is composed of a high coercive force material, as already described, it may readily be magnetized in a direction transverse to its axis so that the poles at opposite ends of a diameter of the spindle 18 cooperate with the poles induced in the ends 12 and 13 of the yoke 15 by current flowing in the winding 16 to produce deflection of the pointer 19. In this arrangement, the midpoint of the scale preferably corresponds to that position of the spindle 18 in which the direction of magnetization is parallel to the faces of the poles 12 and 13 or perpendicular to the lines of flux crossing the air gap by virtue of the magnetizing force of the winding 16. The zero or the neutral position of the movable element may, if desired, be fixed by means of a spiral spring as illustrated in connection with the previous figures, but we have found that the transverse magnetization of the spindle 18 may be conveniently made use of to provide the restoring torque without resort to a biasing spring. For example, if an auxiliary yoke 22' of magnetic material is mounted in the position shown, the permanent magnetization of the spindle 18 will tend to induce opposite poles in the ends 23 and 24 of the yoke 22' which will attract the poles of the spindle 18 to produce a torque biasing the spindle to a given position. If desired, the yoke 22' may also be permanently magnetized with a suitable polarity. For the sake of adjusting the neutral position of the movable element, the yoke 22' may be adjustably mounted by means of a screw 25 cooperating with an elongated, preferably arcuate, slot 26.

The motion of the movable element may be damped by means of a short-circuited turn of conducting material on either yokes 15 or 22' in the manner illustrated in connection with Fig. 3 or by any other desired means. However, in the form of instrument in which the spindle 18 is transversely magnetized, damping may also be accomplished by means of a cylinder or sleeve 27 surrounding a portion of the spindle 18. Obviously, as the spindle 18 oscillates about its axis, eddy currents will be set up in the sleeve 27, tending to resist oscillation. The magnitude of this effect may be increased, if desired, by mounting a second sleeve 28 of highly permeable material, such as, for example, one of the nickel alloys above mentioned, around the sleeve 27 in order to increase the amount of flux in the sleeve 27.

A form of our invention which is particularly suitable for measuring currents in flexible conductors or in conductors which may be passed through a portion of the instrument is illustrated in Fig. 5. In this form of the invention, the magnetic yoke 15 is magnetized by means of current flowing through a conductor 29, inserted in the loop 15' in the yoke 15. Magnetic poles are produced at the ends of the yoke 15 of the auxiliary member 17 in the same manner as in Fig. 2.

Our invention may also be applied to ratio instruments as illustrated in Figs. 6 and 7. The form shown in Fig. 6 consists of a pair of stationary elements of the type shown in Fig. 3. This is the electrical equivalent of connecting the coils 16 of Fig. 1, in separate circuits to be compared instead of in series. The currents to be compared flow in the windings 16a and 16b of Fig. 6 and the connections are such that like poles are induced in the ends 12a and 12b of the magnetic yokes 15a and 15b and, likewise, like poles are induced in the ends 13a and 13b of the yokes 15a and 15b.

The polarity of the vane 11 is so chosen that the top face is of the same polarity as the pole ends 12a and 12b of the yokes 15a and 15b, respectively, and the bottom face is of the same polarity as the pole ends 13a and 13b of yokes 15a and 15b, respectively; consequently, the currents flowing in each of the coils 16a and 16b produce magnetic flux tending to set up repulsion between the vane 11 and the pole ends of the yokes 15a and 15b.

As the vane is driven away from a given pair of pole ends, the force of repulsion from that pair of pole ends obviously decreases and, as the vane 11 is driven toward a given pair of pole ends, the force of repulsion, obviously, increases so that the vane 11 deflects in one direction or another until the repulsive forces of the yokes 15a and 15b are balanced. The position of the pointer 19 serves to indicate the ratio of the currents flowing in the windings 16a and 16b.

In the form of ratio instrument illustrated in Fig. 6, an increased range of ratios may be covered and a tendency for practically the entire vane to come to rest between the weaker pair of pole pieces may be overcome if the distribution of field is modified from that obtained in the form of instrument shown in Fig. 2. For example, the pole tips 12a, 12b, 13a, and 13b may be tapered as shown in Fig. 6 or one pair of pole tips 12a and 12b may be bent up as shown in Fig. 8. A similar result may also be accomplished by modifying the shape of the permanently magnetized vane 11 as shown in Fig. 9 and moving the pole pieces of like polarity further apart.

Any desired type of damping may be employed with the instrument illustrated in Fig. 6. The arrangement illustrated in Fig. 3 would, obviously, also be suitable for the instrument of Fig. 6; however, we have shown by way of illustration still another damping arrangement which may be employed. The conical pivot 30 at the lower end of the shaft 18 is supported by a bearing 31 adjustably mounted in the lower end of a deep cup 32 containing a relatively viscous fluid 33, such as castor oil, for example. Preferably, the fluid 33 is one which has a relatively low coefficient of variation in viscosity with temperature within the temperature range within which the instrument is to be used. It will be understood that the inner diameter of the cup 32 is actually such that a very small clearance of the order of about twenty to thirty thousandths of an inch for example, is provided between the shaft 18 and the inner surface of the cup 32, although the apparatus has been shown out of proportion in the drawing for the sake of clearness.

In the arrangement shown in Fig. 7, two independent stationary members 16a and 16b cooperate with the cam-shaped magnetic vanes 11a and 11b mounted upon the same shaft. The vanes 11a and 11b are permanently magnetized vanes similar to those illustrated in the preceding figures of the drawing except that they are cam-shaped or have a variable radius. The arrangement is such that, when the movable element deflects in one direction or another, the effective radius of the pole faces at the surfaces of the vanes 11a and 11b varies so that, for a given current in the winding 16a or 16b, the torque exerted upon the movable element varies with its angular position. For example, in the arrangement shown in the pole ends 12a and 13a are of south and north polarity, respectively, and the top face of the vane 11a is a north pole and the bottom face is a south pole so that the vane 11a is attracted, but owing to the change in radius, as the pointer 19 deflects to the right, the attraction between the pole ends 12a and 13a and the vane 11a decreases. The pole ends 12b and 13b are similarly polarized south and north, respectively. However, the vane 11b is arranged to have its radius increase instead of decrease with right-hand deflection of the pointer 19, and the vane 11b is polarized with its upper face south and its lower face north so that repulsion takes place between the pole ends 12b and 13b and the torque increases as the pointer 19 deflects to the right. Consequently, the movable element will deflect in one direction or another from whatever position it happens to be in until the two torques acting upon the shaft 18 are balanced and the position of the pointer 19 serves to indicate the ratio of the currents flowing in windings 16a and 16b.

We have herein shown and particularly described certain embodiments of our invention and certain methods of operation embraced therein for the purpose of explaining its principle and showing its application but it will be obvious to those skilled in the art that many modifications and variations are possible and we aim, therefore, to cover all such modifications and variations as fall within the scope of our invention which is defined in the appended claims.

What we claim as new and desire to secure by Letters Patent of the United States, is:

1. In a moving vane electrical instrument, a magnetic vane composed of an alloy comprising substantially 87% silver, 4.3% aluminum, and 8.7% manganese.

2. A current responsive instrument comprising in combination a thin rotatable element permanently magnetized in the direction of its thickness, a current conducting winding and a magnetic yoke linking said winding and having pole portions spaced to form an air gap in which said rotatable element is free to move.

3. A current responsive instrument comprising in combination, a sheet of magnetic material magnetized transversely and mounted to permit rotative deflection about an axis perpendicular thereto, a current conducting winding, and a magnetic yoke linking said winding and having pole portions spaced to form an air gap in which said sheet may deflect.

4. In a direct current electrical instrument comprising in combination a movable permanently magnetized vane, a magnetic yoke cooperating therewith having pole portions between which said vane moves and a current conducting winding linking said magnetic yoke, a damping device comprising a member composed of current conducting material surrounding a portion of said magnetic yoke to form a closed-circuit current path.

5. In an instrument having a transversely magnetized rotatable spindle, a damping arrangement comprising in combination a portion of said spindle and a sleeve composed of current conducting material surrounding said portion of said spindle, thereby causing eddy currents to be induced by oscillations of said spindle to absorb the energy of said oscillations and suppress them.

6. A current responsive instrument comprising in combination a current conducting winding, a magnetic yoke linking said winding and having pole portions spaced to form an air gap therebetween, and a rotatable transversely magnetized spindle mounted with a portion thereof between the pole portions of said magnetic yoke.

7. A ratio indicator comprising in combination a pair of stationary elements, each comprising a current conducting winding and a magnetic yoke linking said winding and having a pair of pole ends spaced to form an air gap therebetween, and a movable element carrying a sheet of transversely magnetized magnetic material mounted with the axis of rotation perpendicular to said sheet, the air gaps of said stationary members being adjacent to permit said movable sheet to pass from one air gap to the other, the connections of said current conducting windings being such that said movable vane is repulsed by each of said stationary members, thereby causing said movable member to be balanced in a position indicating the ratio of the currents flowing in said current conducting winding.

8. A ratio indicator comprising a pair of torque-producing elements, each including a current conducting winding, a magnetic yoke linking said winding and having pole ends spaced therefrom, an air-gap therebetween and a transversely magnetized cam-shaped movable vane adapted to be passed through said air-gap, said movable vanes being mechanically connected and said torque-producing elements being arranged to act in opposition so that the angular position of said movable element serves as indication of the ratio of the currents flowing in said current conducting windings.

9. An astatic electrical measuring instrument comprising a transversely magnetized movable vane, a pair of magnetic yokes having pole ends spaced to form air gaps within which said vane is free to move and current conducting windings linking said magnetic yokes, the connections being such that said vane is attracted by one pair of pole ends and repulsed by the other pair of pole ends.

RALPH G. AREY.
HAROLD T. FAUS.